(12) United States Patent
Biziorek

(10) Patent No.: US 7,222,566 B2
(45) Date of Patent: May 29, 2007

(54) ROTARY BALER

(75) Inventor: Stéphane Biziorek, Champlitte (FR)

(73) Assignee: Deere & Company, Moline, IL (US)

( * ) Notice: Subject to any disclaimer, the term of this patent is extended or adjusted under 35 U.S.C. 154(b) by 8 days.

(21) Appl. No.: 11/208,254

(22) Filed: Aug. 19, 2005

(65) Prior Publication Data

US 2006/0048654 A1 Mar. 9, 2006

(30) Foreign Application Priority Data

Sep. 3, 2004 (DE) .................. 10 2004 042 740

(51) Int. Cl.
*B30B 5/04* (2006.01)

(52) U.S. Cl. ............... 100/87; 100/88; 56/341
(58) Field of Classification Search .............. 100/87, 100/88, 89; 56/341
See application file for complete search history.

(56) References Cited

U.S. PATENT DOCUMENTS

| 4,228,638 A | 10/1980 | Rabe et al. | |
|---|---|---|---|
| 4,433,533 A * | 2/1984 | Giani | ..................... 56/341 |
| 4,686,820 A | 8/1987 | Andra et al. | |
| 4,850,271 A | 7/1989 | White et al. | |
| 5,182,987 A | 2/1993 | Viaud et al. | |
| H001819 H * | 12/1999 | Anderson et al. | ............. 56/341 |
| 6,003,438 A * | 12/1999 | Schwede | ..................... 100/4 |
| 6,530,311 B1 * | 3/2003 | Wilkens et al. | ............... 100/40 |
| 6,874,412 B1 * | 4/2005 | Glaszcz et al. | ............... 100/47 |
| 2002/0059787 A1 | 5/2002 | Viaud | |
| 2004/0182043 A1 * | 9/2004 | Viaud et al. | ................... 53/67 |

FOREIGN PATENT DOCUMENTS

| DE | 38 11 649 | 4/1988 |
|---|---|---|
| DE | 44 42 479 | 11/1994 |
| EP | 0 287 156 | 4/1988 |
| EP | 0 296 709 | 5/1988 |
| EP | 0 634 094 | 7/1994 |
| EP | 1 327 385 | 7/2003 |
| EP | 1 397 954 | 3/2004 |
| FR | 2 579 063 | 3/1985 |

* cited by examiner

*Primary Examiner*—Lowell A. Larson
*Assistant Examiner*—Jimmy Nguyen

(57) ABSTRACT

A rotary baler having a variable size baling chamber for the formation of a cylindrical bale. The baler is configured to measure diameter and the shape of the bale. To measure the shape of the bale, the baler is provided with at least one sensor arranged to generate information regarding the diameter of a bale formed in the baling chamber. The sensor is a non-contacting sensor and is arranged to detect the position of the outer surface of the bale or the surface of an endless conveying element located about the bale.

3 Claims, 1 Drawing Sheet

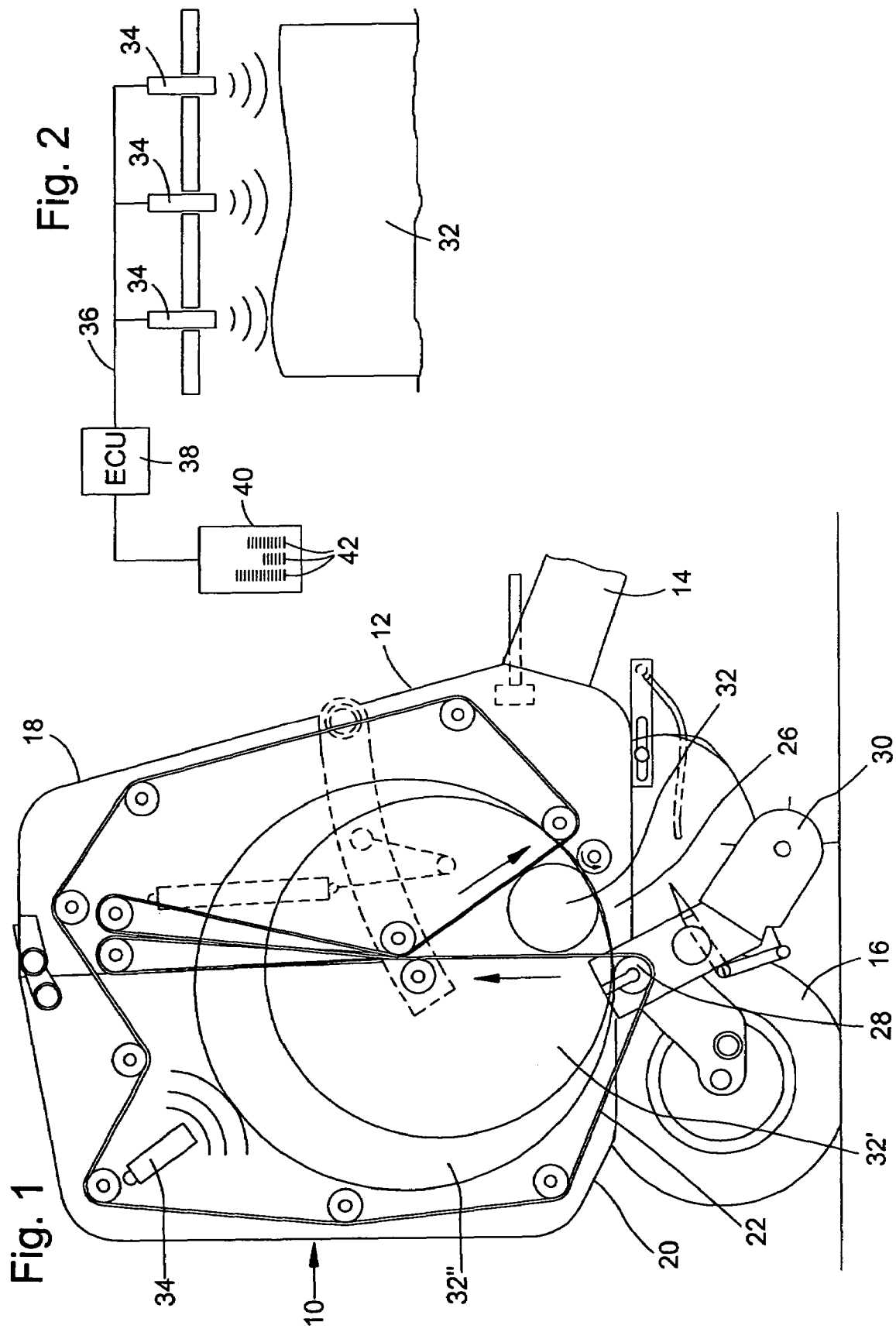

ROTARY BALER

BACKGROUND

1. Field of Invention

The invention generally relates a rotary baler having a variable sized baling chamber. More particularly, the invention relates to such a rotary baler that further includes means for measuring the diameter and shape of a cylindrical bale, and at least one sensor configured to collect information regarding the diameter of a bale formed in the baling chamber.

2. Related Technology

Mechanical arrangements for detecting the size or the symmetry of a bale produced in a rotary baler have been proposed in U.S. Pat. No. 4,433,533 and FR No. 2 579 063 A. These references disclose two rolls that roll on belts that enclose the baling chamber. The position or the symmetry of the rolls is mechanically displayed to the operator of the tractor towing the rotary baler, as taught in FR 2 579 063 A, or is used for the automatic steering of the baler, as in U.S. Pat. No. 4,433,533.

EP 0 634 094 A teaches that the compact height of the bale can be detected using a spring in contact with the side flanks of the bale. This information is converted to an electrical signal using a potentiometer.

Other mechanical arrangements detect the size of the bale at a single measurement point. According to EP 0 287 156 A, the position of the tensioning pulley of the belt is mechanically transmitted to a micro-switch operating magnetically. As taught in EP 0 296 709 A, the position of the tensioning pulley is detected using a potentiometer. Additionally, DE 44 42 479 A discloses that the position of a movable sprocket during the formation of the bale can be detected using an optical sensor.

As a result of the dust generated, the mechanical components of the baler are likely to malfunction. Furthermore, only a single measurement point is available along the width of the bale, so that no reliable information is generated regarding the distribution of the diameter of the bale over its width.

U.S. Pat. No. 4,850,271 describes a rotary baler capable of measuring the diameter of the bale and then subsequently displaying this information. As disclosed, the measuring configuration includes three sensors positioned along the width of the baling chamber, each of which detects the tension in the belts of the baling chamber by use of a spring-loaded mechanism. The mechanism moves potentiometers that are connected to the display arrangement by means of a signal processor. An additional potentiometer detects the position of a tensioning arm of the belts. Relying on the three measurement values of the tension of the belts, the operator can detect the shape and any possible irregularities in the diameter of the bale and perform corresponding steering countermeasures in case that these are still possible. The detection of the diameter with respect to the position of the tensioning arm permits a determination of only the maximum diameter, while the information detected by the tension of the belts regarding the shape of the bale is relatively inexact. The reason for the imprecision is attributed to the fact that the tension of the belts is a function of not only the local dimension of the bale, but is also affected by bearing friction and mechanical properties that vary over the width of the bale, particularly the elasticity of the harvested crop. The mechanical elements of the sensors are exposed to a relatively dusty environment, become contaminated after a relatively short time and then the sensors operating capability is diminished.

DE 38 11 649 C proposes using multiple sensors distributed across the width of the flow of harvested crop, upstream of the baling chamber in a rotary baler, to determine the distribution of the harvested crop. These multiple sensors can also be used for an automatic sideways shifting of the baler and/or of the flow of the harvested crop. The sensors may operate in a non-contacting manner, for example, as capacity sensors or on the basis of light or ultrasonics. In each case, the harvested crop is detected before the baling process begins. The actual size of the bale is not detected.

Consequently, there is need to provide rotary baler capable of measuring the diameter and the shape of a cylindrical bale that is improved over the state of the art.

SUMMARY

These and other objects and advantages of this invention will become apparent to a person of ordinary skill in this art upon careful reading of the detailed description of this including the drawings as presented herein.

The present invention proposes that the position of the outer surface of the bale and/or an endless conveying element enclosing the baling chamber to the outside can be detected in a non-contacting basis by means of an appropriate sensor. The sensor can detect the bale itself at the gaps between the individual conveying elements of the baling chamber or utilize acoustic or electromagnetic radiation that penetrate the conveying element, but are reflected by the surface of the bale. Alternatively, the non-contacting sensor interacts with at least one conveying element of the baling chamber.

Therefore, mechanical elements with limited reliability in dusty environment of a baler are eliminated and avoided. By detecting the bale itself and the position of the endless conveying element, more reliable information about the immediate diameter of the bale can be acquired.

By distributing several, particularly at least three, sensors over the width of the rotary baler, moving one sensor successively back and forth across the width of the rotary baler, or by scanning the entire width of the rotary baler with one sensor, accurate information regarding the distribution can be obtained. This information is provided to the operator of the baler using an appropriate display arrangement, so that, if necessary, the operator can improve the symmetry of the bale by counter-steering. This information can also be provided to an automatic steering arrangement of the tractor of the baler.

Moreover, a computer system can detect the average bale diameter, the concentricity or shape of the bale using the present information. In particular, the computer system can determine whether the bale is convex (barrel-shaped) or concave (hourglass-shaped). Therefore, a display showing that the center of the baling chamber can be filled with harvested crop to a greater or a lesser degree by appropriate steering corrections, in order to attain bales that are as cylindrical as possible, can be provided to the operator or the automatic steering arrangement.

A particularly high resolution of the measured values can also be obtained if each conveying element of the baling chamber is associated with its own sensor.

The sensor operating on a non-contact basis may be configured in various ways. In a preferred embodiment an ultrasonic distance measuring arrangement is applied. The use of a radar, microwave, laser or other distance measuring arrangements is also contemplated.

BRIEF DESCRIPTION OF THE DRAWINGS

These and other features and advantages of the present invention will be better understood by reference to the following detailed description when considered in conjunction with the accompanying drawings. The drawings show an embodiment of the invention that shall be described in greater detail in the following:

FIG. 1 shows a schematic side view of a rotary baler according to the invention; and FIG. 2 shows a schematic view of the arrangement for measuring the diameter and the shape of the cylindrical bale that includes sensors, a computer system and a display arrangement.

DETAILED DESCRIPTION

Referring now to the drawings, FIG. 1 shows a rotary baler 10 with a housing 12 coupled to an agricultural tractor, not shown, by means of a towbar 14, in order to be towed across a field to the right, in a direction of operation. The baler 10 is supported on wheels 16 and the housing 12 is composed of a rigid front housing half 18 and a pivoted rear housing half 20, which are connected to each other via an upper joint. The housing 12 carries a multitude of rolls or rollers. Several endless conveying elements 22, extending alongside each other, are carried over the rolls. The conveying elements 22 largely surround a baling chamber, together with side walls of the housing 12. In this embodiment, the conveying elements 22 are configured as belts but may be otherwise configured. An inlet 26 is provided in the lower region of the baling chamber. The inlet 26 is bordered to the rear by a roll 28 and permits the entry of crop taken up by a pick-up 30 into the baling chamber.

The rotary baler 10 further includes several conveying elements 22 arranged alongside each other. During the harvesting operation, the conveying elements 22 are brought into motion and enclose a bale 32 being formed in the baling chamber on the front, top and rear. As illustrated in FIG. 1, the reference numbers 32, 32' and 32" refer to bales of increasing diameter. The configuration and the operation of such a rotary baler are known. Reference is made to the disclosure of U.S. Pat. No. 6,745,681, which is herein incorporated by reference in its entirety.

Several sensors 34 are fastened to the rear portion of the upper end of the rear housing half 20. As shown in FIG. 2, three sensors 34 are arranged alongside each across the width of the rotary baler 10. The outer sensors 34 interact with the edge regions of the bale 32, while the center sensor 34 interacts with the center of the bale 32. The sensors 34 are conventional ultrasonic distance measuring devices that rely, in particular, on a running time measurement. The sensors 34 detect the spacing between their underside and the adjoining conveying elements 22, not shown in FIG. 2, that are in direct contact with the outer circumference of the bale 32. In this way the sensors 34 provide information regarding the diameter of the bale 32, as a function of the position of the sensor 34.

The sensors 34 are connected to a computer system or electronic control unit (ECU) 38 by a bus connection 36. The computer system, in turn, controls a display arrangement 40 positioned in the operators cab of the agricultural tractor. The sensors 34, the computer system 38 and the display arrangement 40 are supplied with power and current from the on-board network and power source of the agricultural tractor. Preferably the display arrangement 40 and the computer system 38 are components of a bus network system of the agricultural tractor. The three measurement values of the sensors 34 are displayed on the display arrangement 40 in three fields 42, each of which represents a region of the bale 32. The measured values may be provided in graphical, representative or numerical form. By providing this information in this manner, the operator is informed regarding the actual diameter and the shape of the evolving bale 32 and is permitted to take action necessary to correct any deficiencies in the formation of the bale.

As a function of the position of the tractor and the baler 10, the measurement values of the sensors 34 or the values derived from the sensors, such as an average bale diameter or the change in the average bale diameter, can be mapped and geo-referenced by the computer system 38, if appropriately equipped, for later evaluation.

It should be understood, and therefore included within the scope of this invention, that the various elements of the described embodiment can be replaced with a wide variety of different mechanisms or devices including, automated or manual devices. While the principles of the present invention have been made clear in the illustrated embodiments, it will be immediately obvious to those skilled in the art many modifications of structure, arrangement, proportions, the elements, materials and components used in the practice of the invention and otherwise, which are particularly adapted to specific environments without departing from those principles. The following claims are intended to embrace and cover any and all such modifications with the limits only of the true spirit scope of the invention.

The invention claimed is:

1. A rotary baler for forming cylindrical bales comprising:
a variable sized baling chamber defined by a housing and at least one conveying element, the at least one conveying member receiving material and forming the material into a generally cylindrical bale;
at least three non-contact distance sensors located adjacent the baling chamber and being positioned to detect on a non-contacting basis a position of one of said conveying element or bale correlating to the diameter of the bale being formed in the baling chamber and being constructed to generate a signal correlating to the diameter of the bale, wherein the at least three non-contact distance sensors are respectively positioned at three different locations across a width of the baling chamber and are operable for generating three separate signals representing respective diameters of said bale at three locations of said bale corresponding to said three different locations; and
a computer system in communication with the at least three sensors, the computer system being configured to receive said three signals from the at least three sensors and determine whether a shape of the bale is convex or concave.

2. The rotary baler of claim 1 wherein the computer system is configured to determine an average diameter of the bale.

3. The rotary baler of claim 1 wherein each of the sensors is an ultrasonic sensor.

* * * * *